United States Patent Office 2,771,930
Patented Nov. 27, 1956

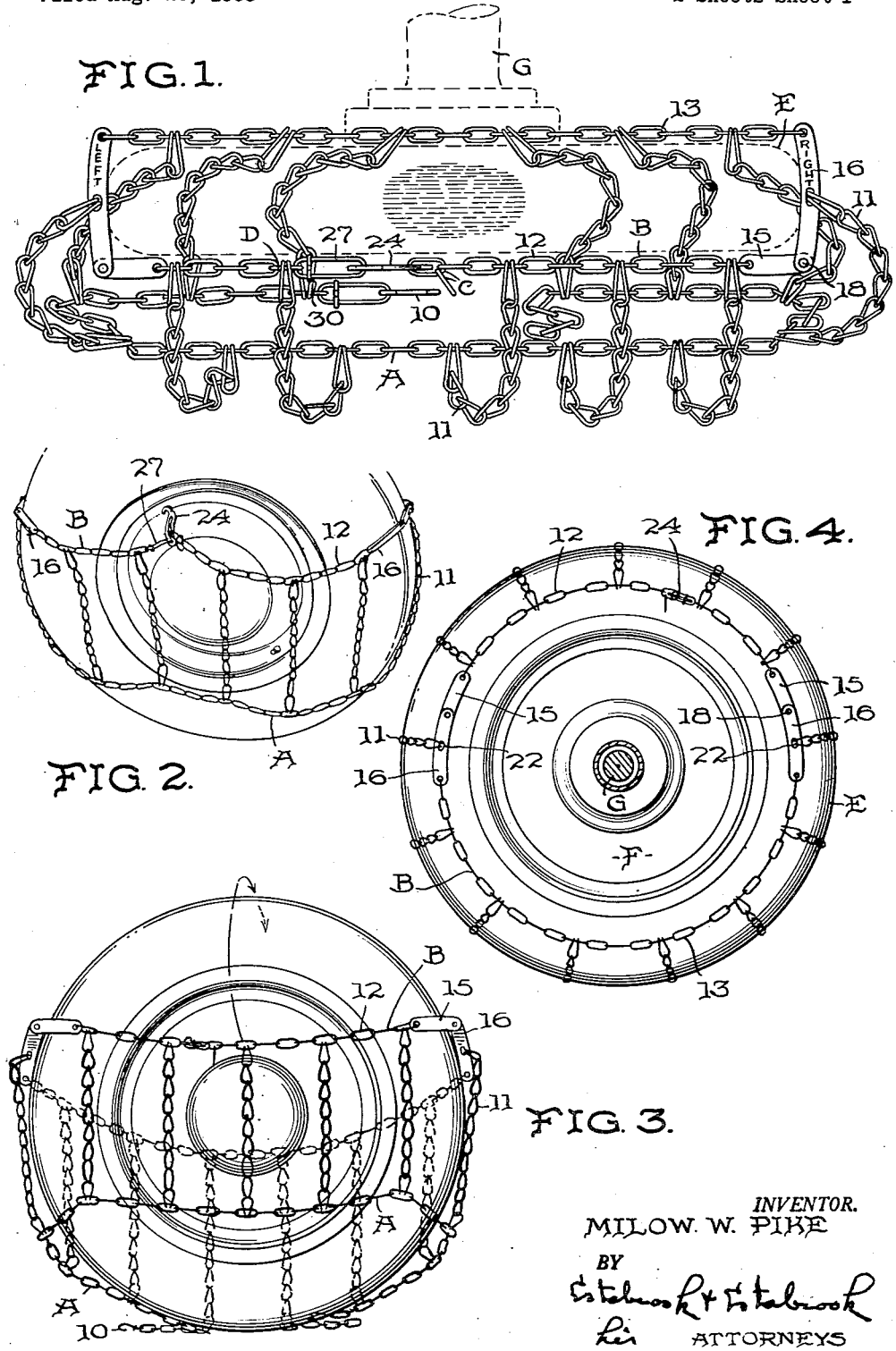

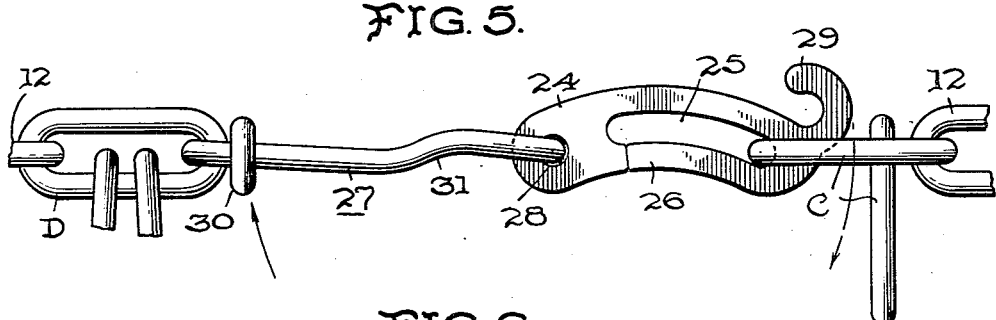
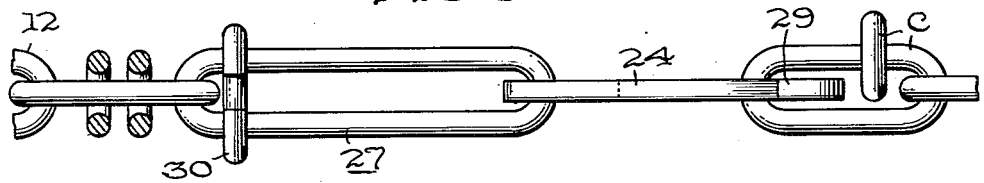
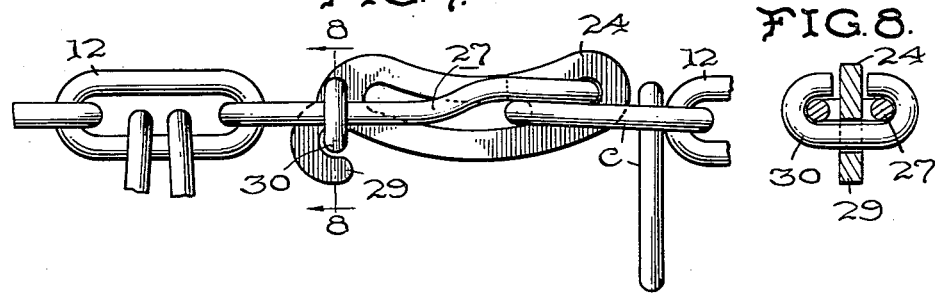
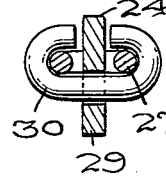
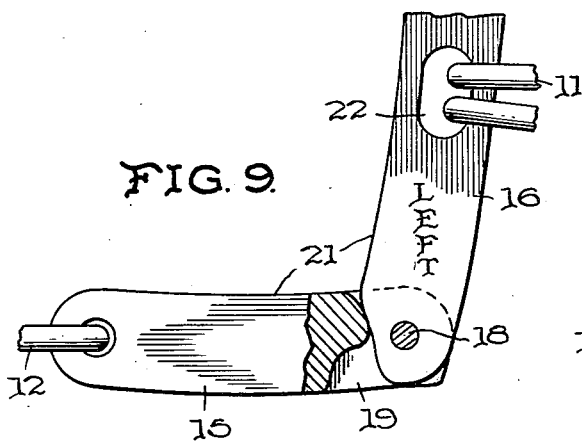
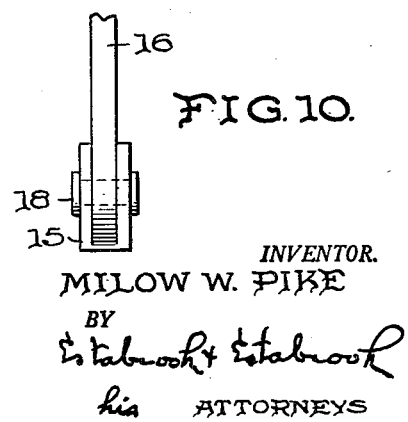

2,771,930

TIRE CHAIN

Milow W. Pike, Omaha, Nebr.

Application August 20, 1953, Serial No. 375,379

2 Claims. (Cl. 152—242)

This invention relates to an improvement in tire chains for automobiles and the like, of the conventional anti-skid type having inner and outer side chains connected together by cross chains.

An object of the invention is to provide a tire chain which may be applied to or removed from a mounted tire of an automobile without the necessity of elevating the wheel and tire.

A further object is in providing an endless inner side chain which may be adjusted to a length to meet the requirements and size of the tire for which the tire chain is intended; and which the circumferential length of which may be increased in applying the tire chain to a tire, and reduced in length to conform to the size of the tire and side wall thereof just prior to moving or pushing the inner side chain over the top of the tire and into engagement with the inner side wall of the tire.

Another object of the invention is in providing the inner side chain of a semi-rigid character, wherein hinged sectors or plates are arranged in the length of the flexible chain links of the inner side chain and so disposed to be in opposed relation to each other in the circumferential or endless inner side chain.

The invention consists of certain novel features of construction and combinations of parts which will be more fully described and set forth in the claims.

In the accompanying drawings:

Figure 1 is a view in plan of the invention and the position assumed by the inner side chain as it is being drawn onto the tire;

Figures 2 and 3 are views in side elevation showing the manner of drawing or pulling of the inner and outer side chains onto a tire;

Figure 4 is a view in side elevation showing the inner side chain when applied and in position on a tire;

Figures 5 and 7 are views in side elevation showing inner side chain fastener in extended and closed positions;

Figure 6 is a view in top plan of the fastener;

Figure 8 is a detail sectional view on line 8—8 of Figure 7 of the fastener locking bar;

Figure 9 is a detail view partly in section of the hinged sector plates;

Figure 10 is an end view of Figure 9.

The tire chain herein disclosed is of the conventional type, having an outer side chain A, and an inner side chain B, formed of suitable links of a chain. The ends of the outer side chain A are connected together after being applied to a tire by a conventional fastener 10. The inner and outer side chains A and B are connected together by the uniformly spaced apart conventional cross chains 11, providing a flexible tire chain wherein all the elements are hingedly connected together.

The inner side chain B, is constructed differently from the outer side chain A, and comprises two sections or lengths of chain 12 and 13, and preferably, the section 13 is of greater length than section 12. Connected to the ends of chain sections 12 and 13 are hinged sector plates 15 and 16. The sectors or plates 15 and 16 are hinged together by a pin 18, and the plate 15 is provided with a bifurcation 19 for the reception of an end of the plate 16. The ends of the sectors or plates are arranged in abutting and overlapping relation to allow the sectors or plates to swing inwardly with respect to the center of the inner side chain B at approximately a 90 degree angle, while their outward movement is restricted and allows the sectors or plates to be arranged in alignment or in substantially a straight line. The sector plates 15 and 16 are preferably of flat metal and have their inner edges or surfaces curved or arc-shaped as at 21. The plate 15 is connected to a link at each end of the chain section 12 and the plate 16 is connected to a link at each end of chain section 13. A cross chain 11 is connected to each plate 16, Figure 2, by a link of the cross chain passing through a hole 22 in the plate 16.

The chain section 12 of the inner side chain B is provided in the length thereof and between two of the cross chains 11 with a slack adjuster which comprises a lever arm 24 having an arcuate or curved slot 25. Received in this slot is one of the links C of the chain section 12. The side wall 26 of the lever arm 24, which forms a part or a wall of the slot 25 is adapted to be sprung sufficiently to permit access to the slot 25 by the link whereupon the side wall 26 is moved back into its original position. An enlarged or loop shaped link 27 is connected to a link D of the chain section 12 at one end and at its opposite end is pivotally connected to the lever arm 24 at one end thereof by passing through an opening 28 in the lever arm. The lever arm is provided at the opposite end thereof from the loop link 27 with a rearwardly bent hook 29. When the lever arm 24 is swung from the position shown in Figures 5 and 6 to the position shown in Figure 7, the hook 29 will be disposed within the looped shaped link 27 and a keeper 30 slidably mounted on the link 27 will be engaged by the hook 29 for confining the lever arm between the walls of the link 27. The chain section 12 will now be of a shorter length as shown in Figure 7, from the position shown in Figure 5 with the link 27 and lever arm in axial alignment with respect to each other. It is to be noted that when the link C of the chain section 12 is in engagement with the lever arm 24, as shown in Figures 5 and 6, it is received at the end of the slot 25 adjacent the hook 29, but when the lever arm is moved from this position 180° in a downward direction as indicated by the arrows, this link C of the section 12 will be located at the opposite end of the slot 25 as shown in Figure 7 and be disposed beneath the link 27. The link 27 adjacent the end thereof which is connected to the lever arm 24 is curved or arced as at 31 to overlie the end of the link of the chain 12 in the slot 25. It will be appreciated that if the chain 12 and the link 27 and arm 24 were transposed from that shown in Figures 5 and 6, the lever arm instead of swinging downwardly would swing upwardly in moving from its position to engaging position with the link 27 and the keeper 30.

The outer side chain A as previously stated, has the ends thereof joined by a conventional fastener 10 when the tire chain has been applied to the wheel. The inner side chain B is made endless and is made of a length and circumference to fit a given size tire. This is accomplished by fitting the desired link C of chain section 12 into the slot 25 of the lever arm 24 and the slot closed so that the link C is confined within the slot so that we have an endless circumferential chain of a size to fit and engage the inner side wall of the tire E when the tire chain is applied to the tire. In applying the tire chain to a tire E mounted on a wheel F, which is resting on the ground, the inner side chain B must be drawn over the outer side of the tire E and over the top thereof so that the inner side chain may rest and engage the inner wall of the tire E and along the side wall thereof. To accomplish this, it is necessary to increase the length or circumference of the inner side chain B, prior to applying it to the tire E, and this is accomplished by having the lever arm 24 and link 27 in alignment as indicated in Figures 5 and 6, until the inner side chain has traveled beyond the greatest diameter of the tire E or beyond the horizontal center line of the tire, taken through the hub and axle of the wheel F and the tire E.

In applying the tire chain to a wheel, having a tire thereon, which is resting on the ground, the tire chain is grasped by the operator, by engaging the opposed sector plates 15 and 16, one set in each hand, and they are generally marked "right" and "left," so that the side chains and cross chains are in proper relation to each other, whereupon the tire chain is placed on the ground in front or in rear of a motor vehicle wheel, so that the tire chain is arranged in the form of a rectangle, leaving an open space for the wheel to be moved into, see Figure 1. In this showing Figure 1 the sector plates 15 and 16 are arranged at right angles to each other showing the position they will assume as they are drawn onto the tire. However, initially in forming the space for the wheel within the tire chain the sector plates are preferably arranged in alignment to provide a rectangular formation of the tire chain with a wider area to accommodate the tire of the wheel. Referring to Figures 1 and 3, the chain section 13 of inner side chain B is on the ground and along the rear or inner side of the wheel F and tire E, which is shown in outline, and beneath the axle G. The chain section 12 of the inner side chain is disposed along the outer side of the tire E with the outer side chain A, and the cross chains 11 are located across the tread of the tire and in front and rear thereof. The sector plates 15 and 16 are grasped by the operator, one set of sector plates in each hand, and drawn up over the tire, with the inner curved edge 21 of the plate 16 in engagement with the tread of the tire, and the inner curved edge 21 of plate 15 in engagement with the outer side wall of the tire. With the opposed sector plates 15 and 16 in this position a firm bearing or gripping surface is provided for the thumbs, fingers and hands of the operator in elevating the inner side chain over the outer surface of the wheel and tire.

It will be recognized that the inner side chain B must be in its extended length or greatest circumference, wherein the lever arm 24 and loop link 27 are in alignment and in their extended positions, as indicated in Figure 5, to provide sufficient slack in the inner side chain.

In applying the inner side chain B to the tire so that it can be drawn over the outer side of the wheel and tire and then over the top of the tire, it is most essential that the inner side chain be provided with slack or additional length in circumference during the application of the inner side chain to the tire. This is accomplished by providing a slack adjuster consisting of the lever arm 24 and loop shaped link 27 which is interposed between two adjacent cross chains 11 of the side chains A and B, which when in unlocked position creates a spacing between the adjacent cross chains 11, equal approximately to twice the ordinary spacing between the cross chains 11. This distance of course may be greater or less depending on the link C which is attached to the lever arm 24, and this is governed by the size of the tire to which the tire chain is to be applied. In this manner provision has been made for increasing the slack in the inner side chain during the application of the tire chain to the wheel and tire, and this slack being required to permit the inner side chain and the sector plates to pass beyond the greatest diameter of the tire.

After the inner side chain has passed the maximum diameter of the tire then this slack is taken up and the lever arm 24 is swung to a position within the confines of the loop link 27 where the lever arm is secured against movement by the hook 29 thereof engaging the keeper 30 of the link 27. This eliminates the slack added to the inner side chain and restores the inner side chain to the length and circumference according to the size of the tire to which it is being applied so that when the inner side chain is moved over the stop of the tire it will lie or engage the inner side wall of the tire.

With the two sets of sector plates 15 and 16 arranged in opposed relation about the tire, and the curved edges 21 thereof disposed across the tread and along the outer side wall of the tire, a greater leverage may be had on the sector plates by the operator, as the sector plates will be maintained in a substantially squared position upon the tread and side wall of the tire. This is essential in moving or pushing the inner side chain B past the greatest diameter of the tire, or past the horizontal center line of the wheel F and tire E. This arrangement of the sector plates with the inner side chain reduces to a minimum the amount of slack required in the inner side chain B to manipulate it past the greatest diameter of the tire.

It is therefore essential to obtain an approximate equal division of the inner side chain B and cross chains 11, so that a substantially equal amount of the inner side chain and cross chains are disposed on and along the inner and outer sides of the tire as the inner side chain B is raised upwardly along the outer side wall of the tire with the sector plates 16 in engagement with the tread of the tire and sector plates 15 engaging the outer side wall of the tire. By this method the two sets of sector plates 15—16 are maintained in a substantially horizontal plane as they are drawn past the greatest diameter of the tire and utilizing the slack in the inner side chain to the greatest advantage where it is most required in passing the greatest diameter of the tire.

In positioning the plates 15 and 16 with their edges 21 in engagement with the outer side wall and tread of the tire, they form an angular or square form across the tire and prevent the sector plates and side chain B from turning, rolling or twisting as the inner side chain B is drawn upwardly toward the top of the tire. This eliminates any twisting of the inner side chain which would shorten the length of the inner side chain and decrease the amount of slack in the inner side chain, which slack being so essential to permit the inner side chain to pass beyond the greatest diameter of the tire.

After the inner side chain B has been drawn onto the tire and beyond the maximum diameter or to a position approximately half-way between the horizontal center line of the hub cap and top of the tire, the sector plates 16 will support the inner side chain B by their engagement with the tread of the tire. The chain section 12 of the inner tire chain B will swing downwardly with the sector plates 15 toward the center line of the tire and wheel due to the amount of slack in the chain section 12. To remove the slack and make the inner side chain B of its proper length and to properly fit the inner side wall of the tire, the lever arm 24 is now swung into a position where it is confined by the loop link 27 and the hook portion 29 thereof engaged by the keeper 30 for securing it in place and taking up the slack in the chain section 12. It is to be noted that with the lever arm in this position the entire strain or pull on the inner side chain B is carried by the link 27 and the slotted portion 25 of the lever arm so that there is no strain on the hook 29 which could cause it to be bent and cause a disengagement of the slack adjuster. It is now possible to take the chain section 12 of the inner side chain B along with the cross chains 11 and move them over the top and tread of the tire and cause the chain section 12 to engage the inner side wall of the tire along with the chain section 13 thereof. Figure 2. The sector plates 16 will be located flat against the inner side walls and extending toward the horizontal center line, and the sector plates 15 will lie flat against the inner side wall and project toward the top of the tire. It will be appreciated that the outer side chain A will now be in engagement with the outer surface of the tire and by grasping the free ends of the outer side chain A they may be drawn together and secured by the fastener 10. It is to be noted that the free ends of the chain A are located along the ground and at the bottom of the tire making them readily accessible for securing the tire chain in place. The inner side chain is secured together at the top of the tire and is located against the inner side wall thereof, while the outer side chain A has the ends thereof secured together adjacent the bottom and outer side of the tire. It is important to have the slack adjuster 24, 27 and the fastening means 10 in diametrically opposed relation in applying and removing the tire chain to and from a tire, as otherwise the slack adjuster would not be accessible, and especially if they were located on a tire directly opposite to each other, as the fastenings are located in a conventional tire chain.

It will be appreciated in view of the foregoing explanation of the mounting of the tire chain on a tire that chain section 13 of the inner side chain is of greater length than chain section 12, and that between the ends of these chain sections two sets of sector plates 15 and 16 are connected. This is important for several reasons, as an instance, when tire chain is to be positioned in the form of a rectangle for the reception of the tire within the rectangular space, the operator will grasp the plates 15 and 16 in each hand and thereby immediately separate the side chains and cross chains to obtain this configuration, and eliminate any entanglements in the tire chain. Also, plate 16 is longer than plate 15, and as the inner side chain B is moved onto the tire, plate 16 will conform to the tread surface of the tire while plate 15 will conform to the side wall of the tire, with both plates having an edge thereof engaging the tire, thereby maintaining an alignment between and tautness in the chain sections 12 and 13.

Chain section 13 is preferably longer than chain section 12, even when chain adjuster 24, 27 is in extended position, to provide for the slack and additional length necessary when chain section 13 is brought into engagement with the axle housing without displacing the plates 15 and 16 from the proper engagement with the side wall and tread of the tire, or interfering with the operator's grasp on the plates 16. The longer length of chain section 13 and shorter section 12 of inner side chain B are held substantially parallel horizontally from one another as they are brought upwardly onto the tire until chain section 13 comes into contact under axle housing when the substantially horizontal straight line parallelism between chain sections 12 and 13 is lost, as chain section 13 takes the form of a V on inner side of wheel as it wraps around the housing and makes alignment with the sector plates 15, 16, that are now squared edgewise across tread and side wall of tire; with sector plates 15 making alignment with the outer slackened section 12 of inner chain B, then situated slightly above chain section 13 horizontally. The sector plates 15 and 16 being positioned diagonally on the thread and side wall of tire are used as anchors while closing the slack adjuster. The sector plates 15 and 16 effect an anchoring of chain section 13 on the tire and retain it in a taut relation on the tire, while allowing chain section 12 to have the necessary slack while the slack adjuster is being manipulated to shorten the length of the inner side chain before it is passed over the top of the tire.

The present invention differs from the conventional tire chain wherein the inner and outer side chains are of the same length and each provided with detachable fasteners, which fasteners may be connected to various links in fitting the tire chain to a tire, by providing an endless inner side chain, the length or circumference of which may be increased and decreased in its application to a tire. The adjustment of the length of the inner side chain is accomplished by the slack adjuster 24, 27, and when the lever arm 24 is connected to the link 27, as in Figure 7, the inner side chain is of a length circumference to fit and conform to the circumference of the side wall of the tire. When the slack adjuster is connected to the links C and D of the chain section 12, the proper link C is attached to the lever arm 24, so that the inner side chain B will not require any further adjustments for future applications to the size of tire for which it has been initially adjusted. After the inner side chain B has been positioned along the inner side wall of the tire, the outer side chain A can then have the ends thereof connected together by the fastener 10, so that both side chains will have engagement with their respective side walls of a tire.

The tire chain may be applied or removed from a tire while on the wheel from a crouching position from the outer side of the wheel without the necessity of reaching inside or in rear of the wheel. Also, to increase or decrease the length of the inner side chain B this is accomplished from the outer side of the wheel and tire by the slack adjuster 24, 27, without the necessity of extending the hands to the inner side of or reaching inside of the wheel.

To remove the tire chain the outer chain fastener 10 is disengaged from an end of the outer side chain so that the free ends of the outer side chain may be draped outwardly from the outer side of the tire. It is now possible to draw the inner side chain B over the top of the tire and cause the lever arm 24 to be released from the keeper 30, whereupon the lever arm can be swung to a position so that it would be in longitudinal alignment with the link 27. This creates a sufficient amount of slack in the inner side chain B to allow it to fall from the tire onto the ground, whereupon the wheel of the vehicle can be rolled out of the chain. It is to be noted as the fastening means for the inner tire chain is at the top of the tire and the fastening means for the outer side chain is at the bottom of the tire, it is always possible to so position the wheel that the two chains A and B may be readily disconnected for removing the tire chain from the wheel.

After the chain has been removed the operator may grasp the two sets of sector plates and place them side by side in a parallel manner and temporarily fasten them together. This permits the chain to be placed in a compact package for storing and prevents or reduces to a minimum the possibility of the chain becoming in a tangled state while not in use.

With this invention ordinarily there is no necessity of elevating the wheel in the application or removal of the tire chain, however, should a car become mired then the wheel could be elevated and the tire chain arranged beneath the wheel in a rectangular manner, when the wheel could then be lowered into the rectangular space and the tire chain applied as above related.

I claim:

1. A tire chain for application to a mounted tire resting on the ground, which tire comprises a tread and side walls, said tire chain having interconnected chain links to provide flexible inner and outer side chains adapted to engage said tire side walls when applied to the tire, cross chains connecting said inner and outer side chains at intervals throughout their length, said outer side chain having separable ends, a slack adjuster interposed in the length of said inner side chain comprising an adjuster link connected to a link of said inner side chain and a lever arm pivotally connected to said adjuster link, said lever arm having an elongated slot in which another link of said inner side chain is received, said adjuster link and said lever arm being pivoted together and when said adjuster link and lever arm are in extended position said slack adjuster and said inner side chain constitute an endless inner side chain having a length corresponding, at least, to the circumference of a tire, said lever arm being adapted to be moved into parallel relation with said adjuster link for reducing the length and slack in said inner side chain so that said inner side chain will be of a circumference and length corresponding to the circumference of said tire inner side wall and for engagement therewith upon application of said tire chain to said tire, means for connecting said adjuster link and lever arm in parallel relation, and means for connecting the ends of said outer side chain together.

2. A tire chain for application to a mounted tire resting on the ground, which tire comprises a tread and side walls, said tire chain having interconnected chain links to provide flexible inner and outer side chains adapted to engage said tire side walls when applied to the tire, cross chains connecting said inner and outer side chains at intervals throughout their length, said outer side chain having separable ends, a slack adjuster interposed in the length of said inner side chain comprising a loop link connected to a link of said inner side chain and a lever arm pivotally connected to said loop link, said lever arm having an elongated slot in which another link of said inner side chain is received, said loop link and said lever arm being pivoted together and when said loop link and lever arm are in extended position said slack adjuster and said inner side chain constitute an endless inner side chain having a length corresponding, at least, to the circumference of a tire, said slack adjuster when said loop link and lever arm are in alinement producing a spacing between adjacent cross chains of a distance greater than the usual spacing distance between said adjacent cross chains, said lever arm being adapted to be moved into parallel relation with said loop link for reducing the length and slack in said inner side chain so that said inner side chain will be of a circumference and length corresponding to the circumference of said tire inner side wall and for engagement therewith upon application of said tire chain to said tire, means for connecting said loop link and lever arm in parallel relation, and means for connecting the ends of said outer side chain together, said slack adjuster of said inner side chain being disposed in a diametrically opposed relation to said fastening means of said outer side chain.

References Cited in the file of this patent

UNITED STATES PATENTS

| | | |
|---|---|---|
| 1,677,353 | Martin | July 17, 1928 |
| 2,524,950 | Arey | Oct. 10, 1950 |
| 2,623,569 | Horner | Dec. 30, 1952 |

FOREIGN PATENTS

| | | |
|---|---|---|
| 124,134 | Sweden | Feb. 22, 1949 |
| 673,623 | Germany | Mar. 25, 1937 |